United States Patent
Nagami (10) Patent No.: US 8,308,575 B2
(45) Date of Patent: Nov. 13, 2012

(54) GEAR MECHANISM WITH TORQUE LIMITER

(75) Inventor: Tetsuro Nagami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 12/742,053

(22) PCT Filed: Nov. 12, 2008

(86) PCT No.: PCT/JP2008/003296
§ 371 (c)(1),
(2), (4) Date: May 7, 2010

(87) PCT Pub. No.: WO2009/090699
PCT Pub. Date: Jul. 23, 2009

(65) Prior Publication Data
US 2010/0243398 A1 Sep. 30, 2010

(30) Foreign Application Priority Data
Jan. 17, 2008 (JP) .................. 2008-008207

(51) Int. Cl.
*F16D 7/02* (2006.01)
(52) U.S. Cl. ........................ 464/45; 464/47
(58) Field of Classification Search .............. 464/37, 464/38, 39, 45, 46, 47, 48
See application file for complete search history.

(56) References Cited

U.S. PATENT DOCUMENTS

| | | | |
|---|---|---|---|
| 3,386,122 A * | 6/1968 | Mathison | |
| 4,043,149 A * | 8/1977 | Tuninetti | 464/46 |
| 4,044,868 A * | 8/1977 | Berger | 464/45 X |
| 2002/0179393 A1* | 12/2002 | Hirabayashi et al. | 464/45 X |

FOREIGN PATENT DOCUMENTS

| | | |
|---|---|---|
| JP | 62-140263 A | 6/1987 |
| JP | 3-17455 U | 2/1991 |
| JP | 4-84831 U * | 7/1992 |
| JP | 2004-360809 A | 12/2004 |
| JP | 2007-292265 A | 11/2007 |

* cited by examiner

*Primary Examiner* — Gregory Binda
*Assistant Examiner* — Matthieu Setliff
(74) *Attorney, Agent, or Firm* — Birch, Stewart, Kolasch & Birch, LLP (57) ABSTRACT

A gear mechanism with torque limiter includes a felt member 14 that is held between a first gear 13 and a second gear 15 coaxially arranged first gear 13 and second gear 15, for transmitting drive power between the gears, such that coupling of drive power between the gears is restricted by slippage of the felt member 14 when an excessive load is applied thereto, wherein multiple protrusions 19a are provided concentrically on the surface of one of the gears 13 (15) in contact with the felt member 14, and concentric grooves 20a corresponding to the protrusions are provided on the surface of the other gear (13) 15.

7 Claims, 6 Drawing Sheets

GEAR MECHANISM WITH TORQUE LIMITER

TECHNICAL FIELD

The present invention relates to a gear mechanism with torque limiter for restricting drive power when an excessive load is applied thereto.

BACKGROUND ART

For example, a vehicle-mounted video apparatus that electrically moves a display section or changes the orientation thereof includes a gear mechanism with torque limiter in order to protect a user from being hurt in the event that the user gets a finger caught in the display section, and to protect components constituting the mechanism from being damaged by an external force. Gear mechanisms with torque limiter include a gear mechanism arranged such that a felt member is gripped or held between a large diameter gear and a small diameter gear disposed coaxially with each other, the felt member is rotated integrally with each gear, and rotation of one gear is transmitted to the other by the frictional force of the felt member. In such a gear mechanism with torque limiter, when a rotation torque is transmitted from one gear to the other gear, if an excessive load is imposed on the other gear, the felt member rotating together with the one gear slips on the contact face thereof between the felt member and the other gear, and thereby the felt member restricts the transmission of the torque to the other gear.

Further, gear mechanisms with torque limiter include a gear mechanism arranged such that a coaxially disposed large diameter gear and small diameter gear each have elongated holes provided therein, a rigid ball is disposed within each of those elongated holes, and the rigid ball is sandwichedly held with two metallic friction plates, thus enabling the transmission of a high torque (See for example, Patent Document 1: JP-A-2004-360809, pp. 5-8, FIGS. 1-5).

Since conventional gear mechanisms having a torque limiter are arranged as described above, when a large drive torque is required by upsizing of a display section or the like, it is necessary to increase the force for gripping a felt member therebetween in the gear mechanism with torque limiter. However, as the force for gripping the felt member therebetween is increased, the thickness of the felt member is gradually reduced. Thus, convexities provided on a gear in order to stabilize the occurrence of the felt member slippling can pierce the felt member causing the tip of the convexity to come in contact with the other gear, which leads to instability of the restricting operation of the gear mechanism based on a predetermined torque limit value. Moreover, abnormal noise is generated by contact between those portions. Also, there is a problem that the application of metallic rigid balls and metallic friction plates to the gear mechanism with torque limiter makes it difficult to downsize and reduce the weight of the mechanism.

The present invention has been made to solve the above-mentioned problems. An object of the present invention is to provide a gear mechanism with torque limiter wherein even if deterioration due to aging, such as a reduction in the thickness of the felt member, occurs, slippage still occurs when a torque greater than or equal to a predetermined torque value is applied thereto, and also the abnormal noise is not produced.

DISCLOSURE OF THE INVENTION

A gear mechanism torque limiter according to the present invention is as follows: a plurality of conical convexities are concentrically arranged on the face of one gear coming in contact with a felt member, and concentric grooves corresponding to the convexities are provided on the face of the other gear.

According to the present invention, since the concentric grooves are provided on the face of the other gear corresponding to the conical convexities arranged on the face of the one gear coming in contact with the felt member, even if the convexity pierces the felt member because of reduced thickness of the felt member due to deterioration with age, the contact between the tip of the convexity provided on the one gear, and the other gear can be prevented; a slippage based on a set torque limit value is generated with reliability to effect a restricting operation with stability based on a torque limit value, and also abnormal noise due to the contact can be prevented.

BEST MODE FOR CARRYING OUT THE INVENTION

Embodiments of the present invention will now be described with reference to the accompanying drawings in order to explain the present invention in more detail.

First Embodiment

Figure 1:
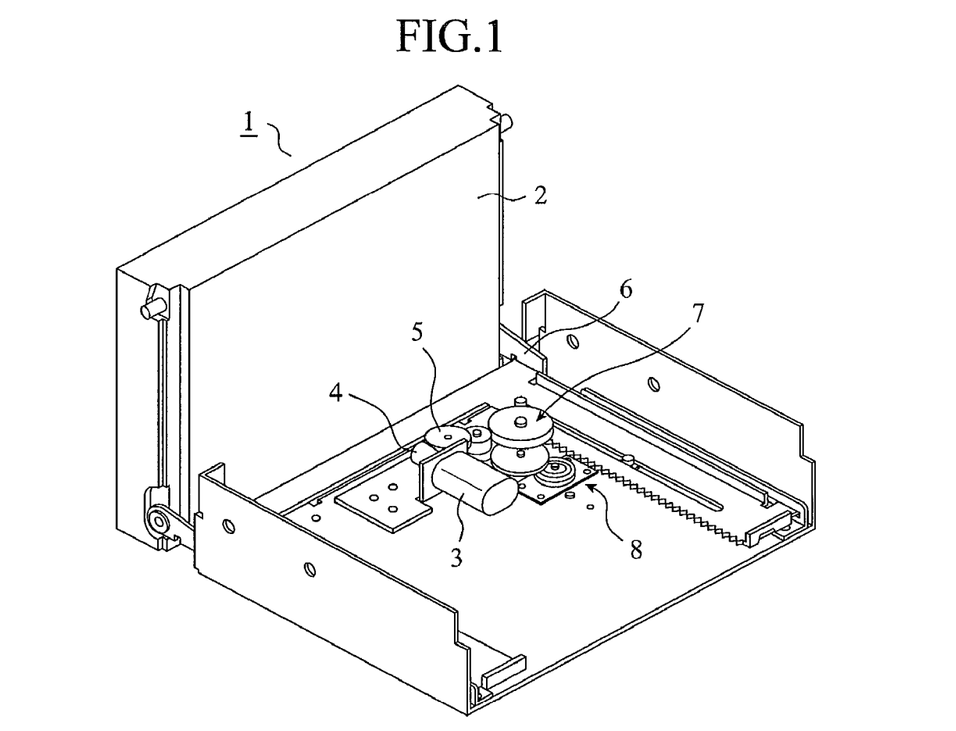
FIG. 1 is an explanatory view for showing a general configuration of a vehicle-mounted video apparatus employing a gear mechanism with torque limiter in accordance with the first embodiment of the present invention.

FIG. 1 is an explanatory view for showing a general configuration of a vehicle-mounted video apparatus employing a gear mechanism with torque limiter in accordance with the first embodiment of the present invention. It is noted that FIG. 1 shows only the portions of the video apparatus relating to the gear mechanism with torque limiter according to the present invention, while representations of the other portions thereof are omitted.

A vehicle-mounted apparatus 1 shown in the figure includes: a display section 2 composed of a video display unit such as an LCD; a motor 3 acting as a driving source for moving the display section 2; a worm gear 4 attached on the rotating shaft of the motor 3; a worm wheel 5 meshing with the worm gear 4; a support member 6 connected with the lower end of each side of the display section 2, for instance to cause the lower side of the display section 2 to move forward or backward of the display unit by rotation of the worm wheel 5; a transmission gear 7 for transmitting the rotating or driving force of the worm wheel 5 to the support member 6; and a position sensor 8 for detecting the position of the moved display section 2 or support member 6.

The display section 2 in FIG. 1 turns a display screen thereof towards the rear in the figure. Moreover, in the display section 2, as mentioned previously, the upper portions of both sides of the display section 2 are supported by a guide member (omitted in the figure), such that the lower portion of the display section 2 connected with the support member 6 moves from the front to the rear in the figure to thereby cause the display screen to transition from a perpendicular state to a horizontal state, and that the lower portion of the display section 2 moves from the rear to the front in the figure to thereby cause the display screen to transition from the horizontal state to the perpendicular state.

It is noted that a double gear having the worm wheel 5 shown in FIG. 1 corresponds to a gear mechanism with torque limiter 10 as described later, the worm wheel 5 meshing with the worm gear 4 in FIG. 1 corresponds to a large gear 15, and the not-depicted portion of the double gear corresponds to a small gear 13 as described later.

Figure 2:
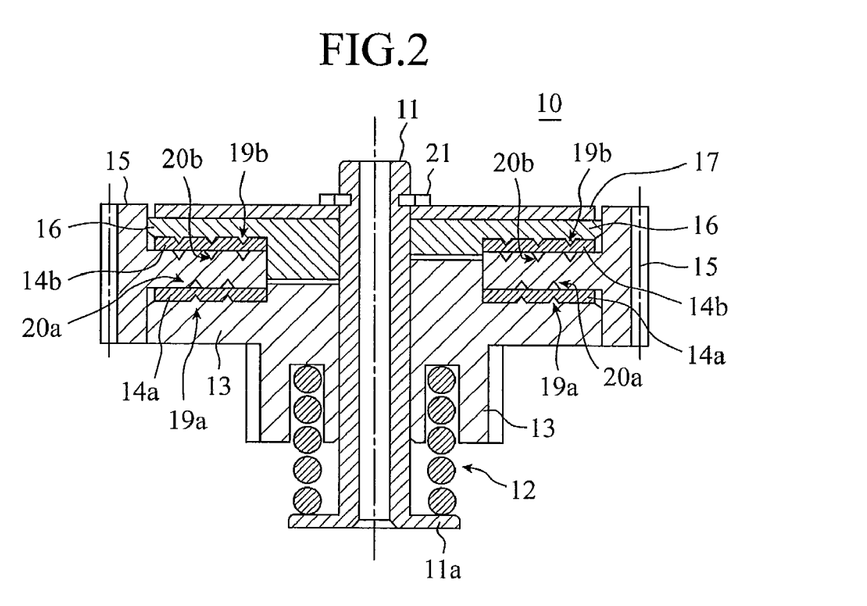
FIG. 2 is an explanatory view for showing a configuration of a gear mechanism with torque limiter in accordance with the first embodiment.
Figure 3:
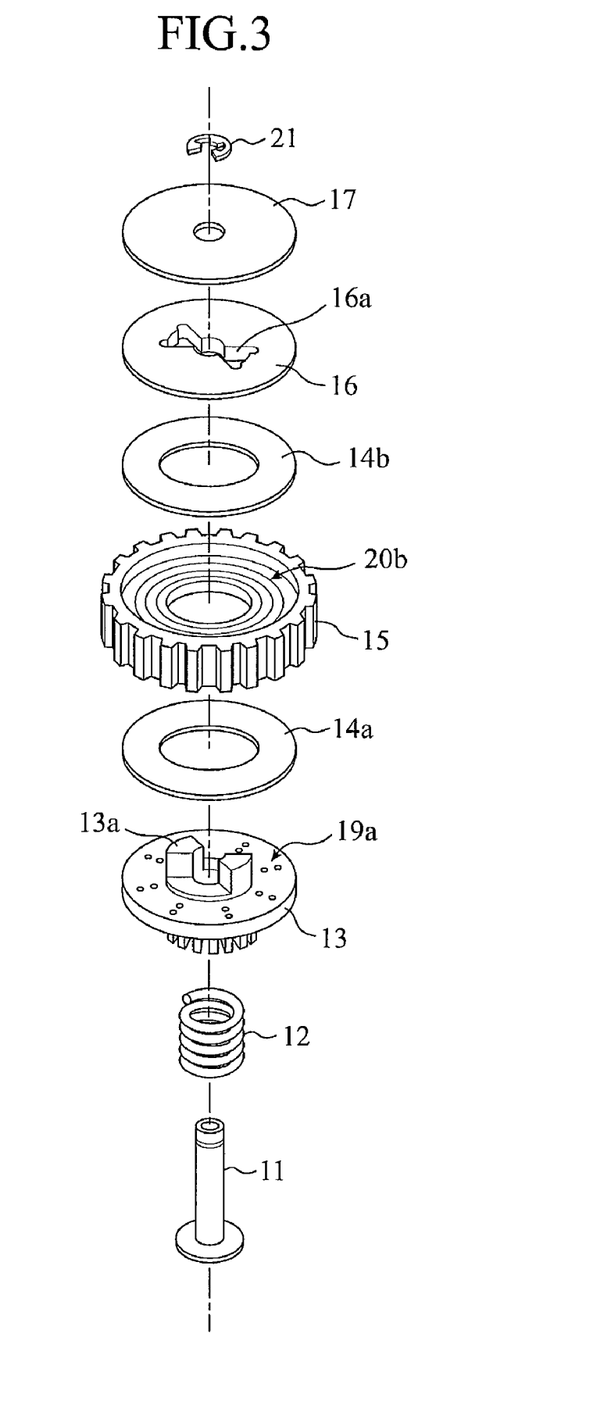
FIG. 3 is an explanatory view for showing a configuration of a gear mechanism with torque limiter in accordance with the first embodiment.

FIG. 2 and FIG. 3 are explanatory views for showing a configuration of a gear mechanism with torque limiter in accordance with the first embodiment. FIG. 2 is a longitudinal sectional view of the gear mechanism 10 with torque limiter having a gear mechanism in accordance with the first embodiment, and FIG. 3 is an exploded perspective view of the gear mechanism with torque limiter 10. In FIG. 2 and FIG. 3, the same parts are designated by similar reference numerals to represent each section.

The gear mechanism with torque limiter 10 is composed of a coil spring 12, a small gear 13 that is a first gear, a felt member 14a that is a second felt member, a large gear 15 that is a second gear, a felt member 14b that is a first felt member, a synchronous member 16, and a presser plate 17, which are stacked in this order. Those members each have a circular shape when viewed from above, and each have a through-hole at the circular center thereof. It is noted that the small gear 13 has a smaller diameter, while the large gear 15 has a larger diameter, though the magnitude relation therebetween is not limited to that illustrated herein. A spindle 11 equipped with a flange 11a at one end thereof is passed through the through-holes of the members; specifically, the spindle is passed therethrough from below as shown in FIG. 2 and FIG. 3 such that the coil spring 12 comes in contact with the flange 11a at the lower end thereof. To be more exact, the small gear 13 and the large gear 15 are disposed coaxially with each other, and the felt member 14a is gripped or held between the upper face of the small gear 13 and the lower face of the large gear 15. Further, the felt member 14b is held between the upper face of the large gear 15 and the lower face of the synchronous member 16.

The coil spring 12 is provided axially of the spindle 11 so as to energize the members upwardly in the figure, the energizing force pressing the small gear 13, the felt member 14a, the large gear 15, the felt member 14b, the synchronous member 16, and the presser plate 17 upwardly. Further, the presser plate 17 is positioned and fixed to the spindle 11 by the holdback E ring 21 secured to the top end of the spindle. In this way, the energizing force of the coil spring 12 serves the above-mentioned members penetrated by the spindle 11 to closely contact each other.

Figure 4:
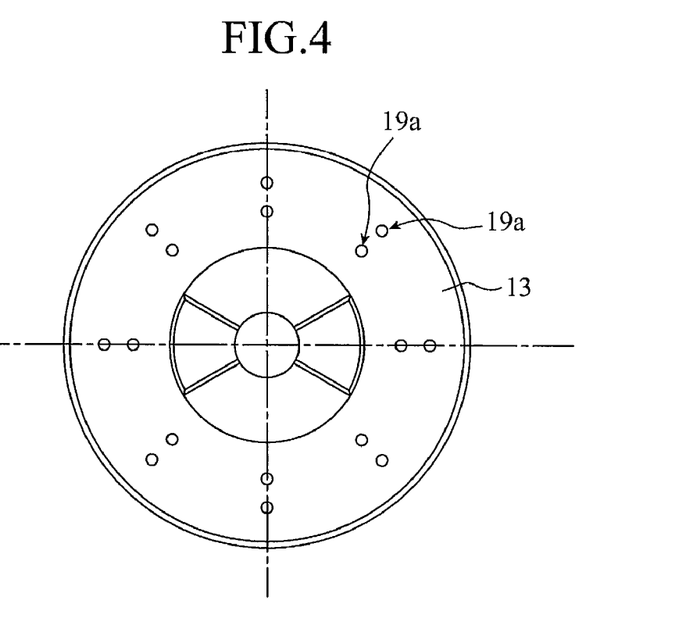
FIG. 4 is an explanatory view for showing a small gear of a gear mechanism with torque limiter in accordance with the first embodiment.

FIG. 4 is an explanatory view showing a small gear of a gear mechanism with torque limiter in accordance with the first embodiment. The same parts as those shown in FIG. 2 are designated by similar reference numerals, and redundant explanations of the numerals will be omitted. The figure illustrates the shape of the small gear 13 shown in FIG. 2 and FIG. 3 as viewed from above, that is, the upper face thereof. Provided on the upper face of the small gear 13 or the face coming in contact with the felt member 14a are a plurality of, for example, conical convexities 19a for preventing slipping between the upper face of the small gear 13 and the felt member 14a by digging into the felt member 14a, and those convexities 19a are disposed concentrically on the small gear 13. Hereupon, the convexities 19a are provided in the number corresponding to the magnitude of the torque to be transmitted. Further, the convexities 19a may be disposed on a plurality of circumferences as shown in FIG. 4. The convexities 19a are provided thereon in order to restrict slippage between the felt member 14a and the small gear 13 by digging into or sticking in the lower face of the felt member 14a and thereby reduce the variation of a slipping operation performed based on a torque limit value set for the gear mechanism with torque limiter 10. The felt member 14a serves as a face to cause the face coming in contact with the lower face of the large gear 15 to be slipped.

Moreover, provided at the circular central portion of the upper face of the small gear 13 is a joint 13a, as shown in FIG. 3, which projects from the upper face thereof to be jointed or fitted in a joining hole 16a of the synchronous member 16 described later. It is noted that the small gear 13 illustrated herein has gear teeth downwardly projecting from the lower face thereof.

Figure 5:
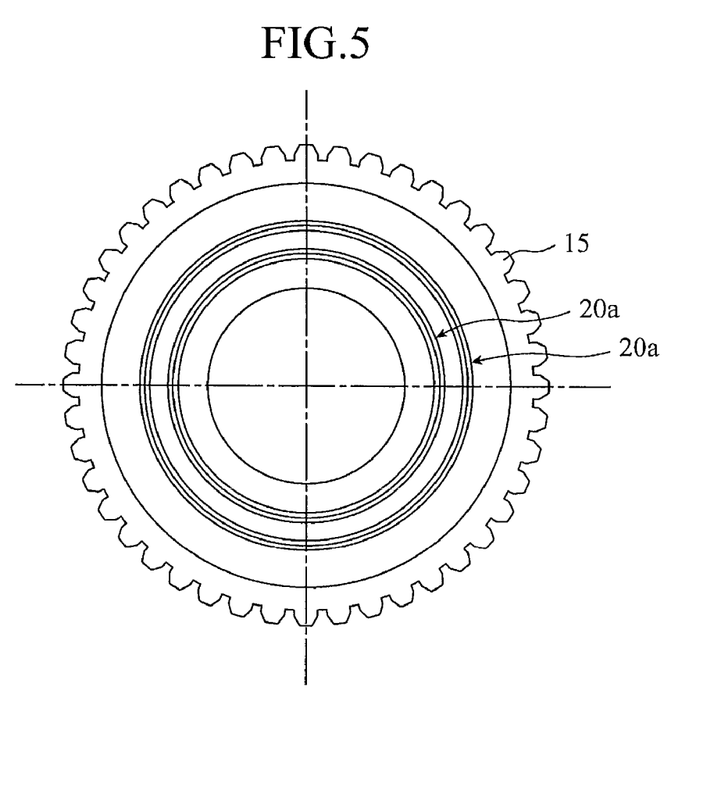
FIG. 5 is an explanatory view for showing a large gear of a gear mechanism with torque limiter in accordance with the first embodiment.

FIG. 5 is an explanatory view for showing a large gear of a gear mechanism with torque limiter in accordance with the first embodiment. The same parts as those shown in FIG. 2, are designated by similar reference numerals, and redundant explanations thereof will be omitted. The figure illustrates the shape of the large gear 15 shown in FIG. 2 and FIG. 3 when viewed from below, namely, the lower face of the large gear 15. Circular grooves 20a are provided on the lower face of the large gear 15 or the face coming in contact with the felt member 14a so as to correspond to the locations of the convexities 19a of the small gear 13, respectively. The grooves 20a are formed so as to be concentric with the large gear 15, and each of the grooves has a radius equal to the distance from the center of the rotating shaft of the small gear 13 to each of the convexities 19a, that is, a radius of the circumference on which each of the convexities 19a is disposed. When the convexities 19a have been disposed on a plurality of circumferences, a plurality of the grooves 20a are also provided; specifically, provided are the grooves 20a each having the same radius as that of the circumference where each of the convexities 19a is arranged. Furthermore, grooves 20b corresponding to convexities 19b of the synchronous member 16 as discussed later are provided on the upper face of the large gear 15, respectively. Each of those grooves 20b is of a circular shape having the same radius as that of the circumference where the convexity 19b is disposed as with the groove 20a corresponding to the above-discussed convexity 19a. It is noted that the large gear 15 illustrated herein has gear teeth around the circumferential portion thereof.

In order for the felt member to meet a high torque limit value, the felt member should have an increased contact area. Therefore, in the gear mechanism with torque limiter 10, the large gear 15 having the felt member 14a coming in contact with the lower face thereof also has the felt member 14b coming in contact with the upper face thereof.

The felt member 14a and the felt member 14b are made of a similar material, and further have a similar shape. More specifically, each of the felt members is formed of a material giving rise to a predetermined frictional force between the felt member and the large gear 15 by the energizing force of the coil spring 12, and having a frictional property with which the felt member slips on each of the contacting faces of the large gear 15, specifically on the lower face and the upper face thereof when a torque larger than or equal to a set torque limit value is imposed thereon. The felt members each further have a through-hole of a diameter needed for receiving the joint 13a of the small gear 13 passed therethrough at the circular center thereof.

The synchronous member 16 has the joining hole 16a for receiving the joint 13a of the small gear 13 jointed thereon provided at the circular center thereof, as shown to FIG. 3, and is arranged to be rotated integrally with the small gear 13 about the spindle 11 as a center. Furthermore, the synchronous member 16, as shown to FIG. 2, has concentrically provided on the lower face thereof or the face coming in contact with the felt member 14b, a plurality of convexities 19b as with the plurality of convexities 19a provided on the small gear 13. The convexities 19b are provided thereon in order to restrict the slip between the felt member 14b and the synchronous member 16 by digging into or sticking in the upper face of felt member 14b, and reduce the variation of a slipping operation performed based on a torque limit value set for the gear mechanism with torque limiter 10 as with the above-discussed convexities 19a. The felt member 14b serves the face coming in contact with the upper face of the large gear 15 as a face to be slipped.

Further, in order to increase the energizing force of the coil spring 2 when the energizing force should meet a higher torque limit value, the rigid presser plate 17 is arranged to come in contact with the E ring 21 so that the synchronous member 16 is not deformed by the energizing force.

Figure 6:
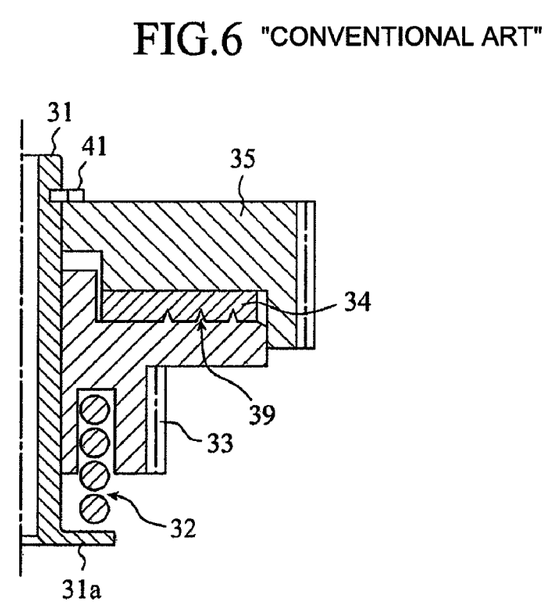
FIG. 6 is an explanatory view for showing a general gear mechanism with torque limiter.
Figure 7:
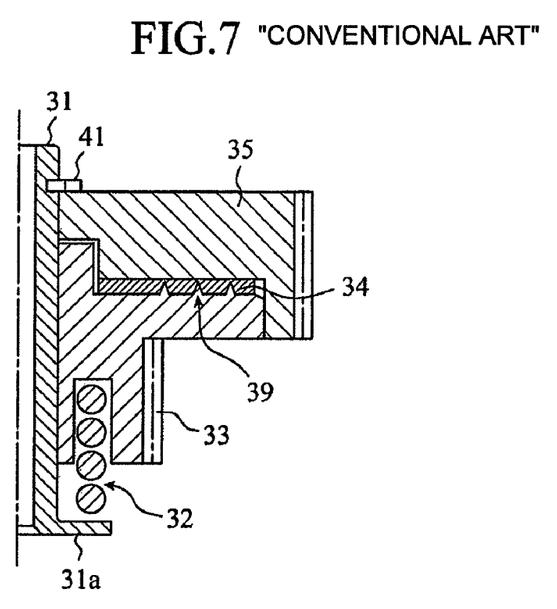
FIG. 7 is an explanatory view for showing a general gear mechanism with torque limiter.

FIG. 6 and FIG. 7 are explanatory views for showing a general gear mechanism with torque limiter, FIG. 6 shows a state where the felt member 34 does not yet deteriorate with age, and FIG. 7 shows a gear mechanism with torque limiter having its felt member 34 reduced in thickness because of deterioration with age or the like.

The gear system is arranged such that the felt member 34 held between the opposing faces of the small gear 33 that is a first gear and the large gear 35 that is a second gear is assembled to the spindle 31, the E ring 41 attached to the spindle 31 restrains the second gear 35 from axially moving, and the coil spring 32 for pressing the first gear 33 to the side of the second gear 35 through the felt member 34 is disposed between the first gear 33 and the flange 31a of the spindle 31.

The gear mechanism with torque limiter shown in FIGS. 6 and 7 performs a drive transmission between the small gear 33 and large gear 35 by using the frictional force of the felt member 34 generated by the energizing force of the coil spring 32, and causes those members to rotate integrally with one another. When an excessive load is imposed thereon, a slip occurs between the upper face of felt member 34 and the lower face of the large gear 35 to restrict the torque transmission therebetween.

The felt member 34 is always maintained in compressive contact with the small gear 33 and the large gear 35 in the state where it is sandwiched therebetween by the energizing force of the coil spring 32. When a slip occurs in such a compressive contact, the felt member receives wear, and the thickness of the felt member is gradually reduced by the pressure. As shown in FIG. 7, as the thickness of the felt member 34 is reduced, the convexities 39 provided in order to cause the felt member 34 to rotate integrally with the small gear 33 can pierce the felt member 34 to thus come in contact with the lower face of the large gear 35, the slipping operation to be activated when a torque larger than or equal to a predetermined value is imposed thereon becomes unstable, and also, when the slip occurs, abnormal noise may be generated.

By contrast, in accordance with the first embodiment of the present invention, provided on the lower face of the large gear 15 are the grooves 20a corresponding to the convexities 19a of the small gear 13, and also provided on the upper face of the large gear 15 are the grooves 20b corresponding to the convexities 19b of the synchronous member 16. Thus, even if the convexity 19a sticking in the felt member 14a pierces the felt member 14a or even if the convexity 19b sticking in the felt member 14b pierces the felt member 14b, because the felt members 14a and 14b each have the reduced thickness due to deterioration with age, the grooves 20a and 20b provided on the felt-contacting faces of the large gear 15, that is, on the upper or lower face of the large gear 15, can prevent those faces from being contacted with the tip of the convexity; thus, an occurrence of slip based on a set torque limit value is ensured, and also abnormal noise by the contact therebetween can be prevented. For this reason, a stable restricting operation on the basis of a predetermined torque limit value can be performed even in a long-term use.

Further, even if the convexities pierce the felt members 14a and 14b because the thicknesses of the felt members 14a and 14b are reduced with age, the convexities enter the respective grooves corresponding to the convexities, and thus the convexities provided on one gear do not abut against the other gear. Thus, the components constituting the gear mechanism can be formed in a thinner manner.

Second Embodiment

Figure 8:
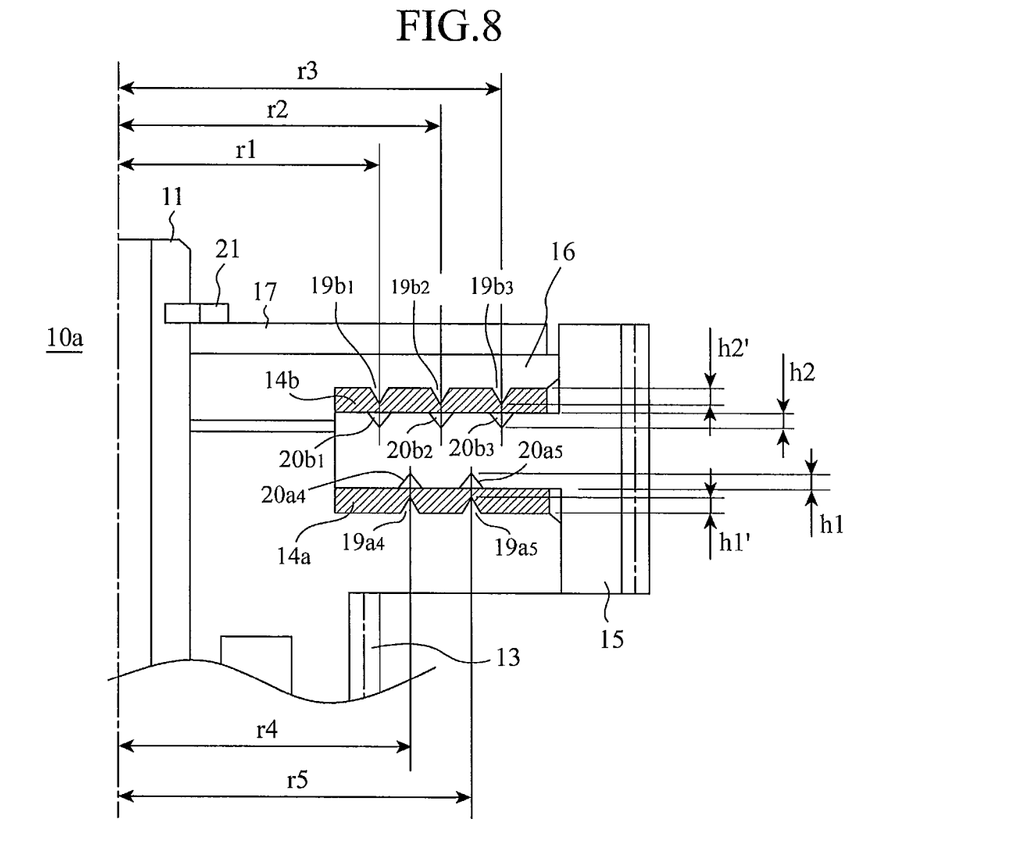
FIG. 8 is an explanatory view for showing a configuration of a gear mechanism with torque limiter in accordance with the second embodiment of the present invention.

FIG. 8 is an explanatory view for showing a configuration of a gear mechanism with torque limiter in accordance with the second embodiment of the present invention. The parts same as or corresponding to those shown in FIG. 2 to FIG. 5 are designated by similar reference numerals, and redundant explanations thereof will be omitted. The gear mechanism with torque limiter in accordance with the second embodiment is arranged generally as with the above-discussed gear mechanism with torque limiter 10. The portions characteristic of the gear mechanism with torque limiter in accordance with the second embodiment will be explained to avoid redundant descriptions about the portions arranged like those discussed in the first embodiment. FIG. 8 is a sectional view of a gear mechanism with torque limiter 10a in accordance with the second embodiment, and shows the one side portion of the gear mechanism with torque limiter 10a from the rotation center thereof.

A large gear 15 of the gear mechanism with torque limiter 10a in FIG. 8 has grooves 20a4 and 20a5 with a depth h1 provided on the lower face thereof, and a small gear 13 thereof in FIG. 8 has convexities 19a4 and 19a5 with a height h1' provided on the upper face thereof. The grooves 20a4 and 20a5 each are arranged such that their depth h1 has substantially the same size or dimension as that of the height h1' of the convexities 19a4 and 19a5.

Further, the large gear 15 in FIG. 8 has grooves 20b1 to 20b3 with a depth h2 provided on the upper face thereof, and the synchronous member 16 in FIG. 8 has convexities 19b1 to 19b3 with a height h2' provided on the lower face thereof. The grooves 20b1 to 20b3 are each arranged such that their depth h2 has substantially the same size as that of the height h2' of the convexities 19b1 to 19b3.

In such a way, it is arranged that the size of the depth of the grooves 20b1 to 20b3 provided on the upper face of the large gear 15 is substantially equal to or larger than that of the height of the convexities 19b1 to 19b3 provided on the synchronous member 16, and that further the size of the depth of the grooves 20a4 and 20a5 provided on the lower face of the large gear 15 is substantially equal to or larger than that of the height of the convexities 19a4 and 19a5 provided on the small gear 13. Thereby, the tip of each convexity can be prevented from coming in contact with the large gear 15 even if the thickness of the felt members 14a and 14b is reduced. In other words, the convexity can be prevented from coming in contact with the face of the gear opposed thereto by arranging the cross section of the groove formed orthogonally to the extending direction thereof or the circumferential direction thereof to have dimensions equal to or larger than those of the outward configuration of the convexity to which the groove corresponds.

Further, referring to FIG. 8, a convexity 19b1 of the synchronous member 16 and a groove 20b1 of the large gear 15 are provided at a position a distance of r1 away from the center of the spindle 11 or on the circumference with a radius of r1. Moreover, a convexity 19b2 and a groove 20b2 are provided on the circumference with a radius of r2, and a convexity 19b3 and a groove 20b3 are provided on the circumference with a radius of r3. In FIG. 8, a convexity 19a4 of the small gear 13 and a groove 20a4 of the large gear 15 are provided on the circumference with a radius of r4, and a convexity 19a5 and the groove 20a5 are provided on the circumference with a radius of r5. At that time, the distances r1 to r5 are set such that the equations $r4 \approx (r1+r2)/2$ and $r5 \approx (r2+r3)/2$ hold true, and further, as shown in FIG. 8, it is arranged that the position of the convexity 19a4 of the small gear 13 and the groove 20a4 of the large gear 15 is located at a point intermediate or substantially intermediate between the position of the convexity 19b1 of the synchronous member 16 and the groove 20b1 of the large gear 15, and the position of the convexity 19b2 thereof and the groove 20b2 thereof. Furthermore, it is arranged that the position of the convexity 19a5 of the small gear 13 and the groove 20a5 of the large gear 15 is located at a point intermediate or substantially intermediate between the position of the convexity 19b2 of the synchronous member 16 and the groove 20b2 of the large gear 15, and the position of the convexity 19b3 thereof and the groove 20b3 thereof. It should be understood that the numbers of the convexities and the grooves shown in FIG. 8 are not limited to those shown in the figure.

When the convexities and the grooves are provided as discussed above, the grooves 20b1 to 20b3 of the upper face of the large gear 15 and the grooves 20a4 and 20a5 of the lower face thereof do not coincide with each other in position in the vertical direction. And disposed at a position below substantially the midpoint between the groove 20b1 and the groove 20b2 of the upper face thereof is the groove 20a4 of the lower face thereof, and disposed at a position below substantially the midpoint between the groove 20b2 and the groove 20b3 of the upper face thereof is the groove 20a5 of the lower face thereof. The grooves are thus vertically arranged in a staggered manner, and thus it becomes possible to form the portion of the large gear 15 coming in contact with the felt members in a thickness-reduced structure, which enables the entire large gear 15 to be formed in a thin shape.

As discussed above, in accordance with the second embodiment of the present invention, it is arranged that the size of the depth of the grooves 20b1 to 20b3 provided on the upper face of the large gear 15 is larger than or equal to that of the height of the convexities 19b1 to 19b3 provided on the synchronous member 16, and that the size of the depth of the grooves 20a4 and 20a5 provided on the lower face of the large gear 15 is larger than or equal to that of the height of the convexities 19a4 and 19a5 of the small gear 13. Thus, even if the gear mechanism has the felts 14a and 14b gradually reduced in thickness to cause the convexities to pierce the felts, the tip of each convexity can be prevented from coming in contact with the large gear 15, a stable slipping operation based a predetermined torque limit value can be performed, and further, abnormal noise can be prevented from being generated by the contact therebetween.

Furthermore, the grooves 20b1 to 20b3 provided on the upper face of the large gear 15 and the grooves 20a4 and 20a5 provided on the lower face thereof are arranged in a staggered manner in a vertical direction of the large gear 15. Thus, the large gear 15 can be formed in a thin structure to enable the thick reduction of the gear mechanism with torque limiter 10a, and the components constituting the gear mechanism can be formed in a thin structure.

Third Embodiment

Figure 9:
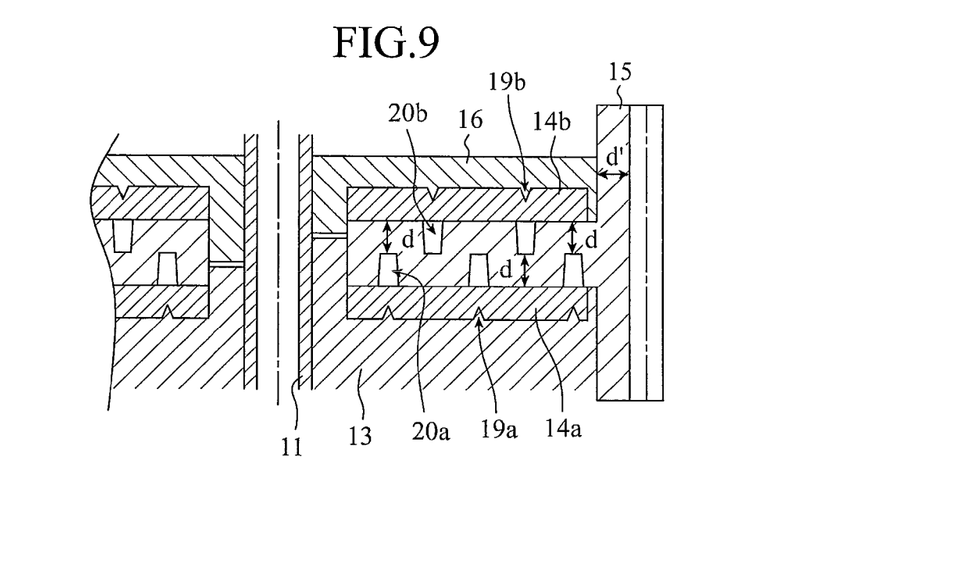
FIG. 9 is an explanatory view for showing a configuration of a gear mechanism with torque limiter in accordance with the third embodiment of the present invention.

FIG. 9 is an explanatory view for showing a configuration of a gear mechanism with torque limiter in accordance with the third embodiment of the present invention. The parts same as or corresponding to those shown in FIG. 2 are designated by similar reference numerals, and redundant explanations thereof will be omitted. FIG. 9 shows the cross section of a large gear 15 and the other parts of a gear mechanism with torque limiter in accordance with the third embodiment, and the parts omitted for illustration are arranged substantially as with those explained in the first embodiment. It should be understood that the numbers of the convexities 19a and 19b and the grooves 20a and 20b shown in FIG. 9 are not limited to those shown in the figure.

In the large gear 15 shown in FIG. 9, as with the large gear 15 explained in the second embodiment, a plurality of grooves 20b provided on the upper face and a plurality of grooves 20a provided on the lower face in FIG. 9 are arranged in a staggered manner with respect to each other, e.g., at equally spaced intervals so as not to be in an overlying relation with each other in a vertical direction. Further, the depth and the width of each of the grooves 20a and 20b, in other words, the dimensions of the cross section thereof orthogonal to the extending direction or the circumferential direction of each groove are arranged to be equal to or larger than the dimensions of each of the convexities 19a and 19b corresponding to each groove, while the portions of the large gear 15 having those grooves 20a and 20b provided thereon are arranged to have a thickness of d. Moreover, the thickness d' of the circumferential portion of the large gear 15 having the gear teeth provided thereon is also arranged to be substantially equal to the thickness d, thus building the whole large gear 15 in the same thickness.

As discussed above, in accordance with the third embodiment of the present invention, the whole large gear 15 is arranged to be constructed in the same thickness. Thus, the formation of the large gears 15 becomes easy, unevenness in quality of the products can be reduced because of the reduced occurrence of warpage and deformation thereof, and a gear mechanism with torque limiter performing a stable restricting operation based on a predetermined torque limit value can be provided.

Fourth Embodiment

Figure 10:
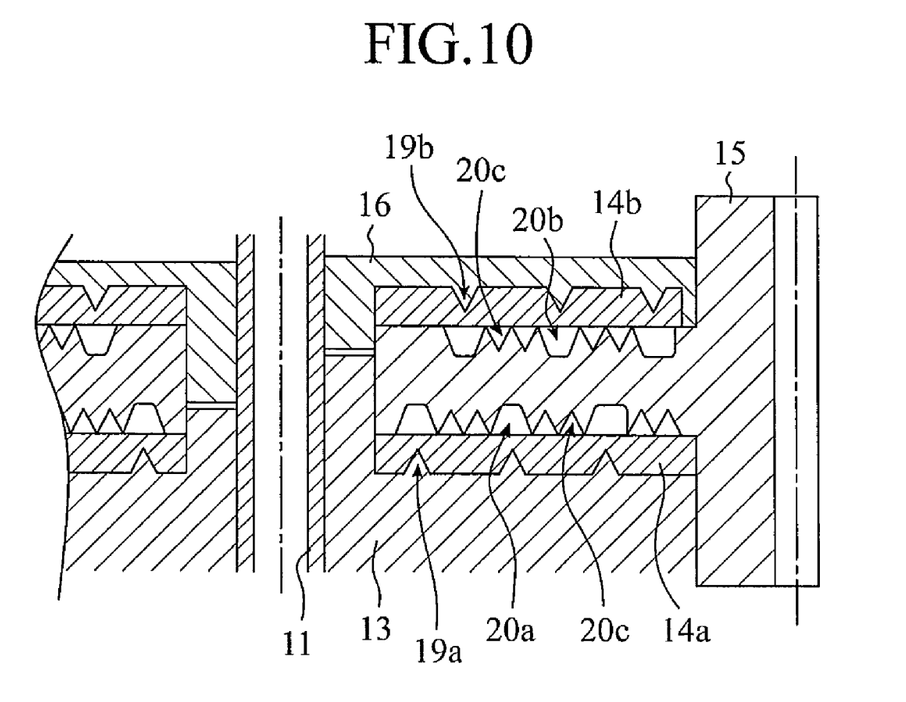
FIG. 10 is an explanatory view for showing a configuration of a gear mechanism with torque limiter in accordance with the fourth embodiment of the present invention.

FIG. 10 is an explanatory view for showing a configuration of a gear mechanism with torque limiter in accordance with the fourth embodiment of the present invention. The parts same as or corresponding to those shown in FIG. 2 are designated by similar reference numerals, and redundant explanations thereof will be omitted. FIG. 10 illustrates the cross section of a large gear 15 and the like of a gear mechanism with torque limiter in accordance with the fourth embodiment, and the parts omitted for illustration are arranged substantially as with those explained in the first embodiment or the like.

The large gear 15 shown in FIG. 10 has a plurality of grooves 20b provided on the upper face, and has a plurality of grooves 20a provided also on the lower face. Those grooves, just as with those discussed in the first embodiment, e.g., are provided corresponding to the convexities of the small gear 13 and the synchronous member 16. It should be appreciated that the numbers of the convexities 19a and 19b and the grooves 20a and 20b shown in FIG. 10 are not limited to those shown in the figure.

The large gear 15 shown in FIG. 10 has a plurality of grooves 20c provided in each of the spaces between the grooves 20b provided on the upper face thereof. The large gear illustrated in FIG. 10 has two grooves 20c in each of the spaces therebetween. Each of the grooves 20c forms a shape concentric with the groove 20a, the groove 20b, or the large gear 15. In other words, each of the grooves 20c is provided at a position not corresponding to the convexities provided on the small gear 13 and the synchronous member 16. The large gear 15 has a plurality of grooves 20c thus provided thereon to form felt-contacting sections.

Further, each of the grooves 20c shown in FIG. 10 is provided thereon such that the space between the groove 20c and the adjacent groove 20c forms a serrated shape. Specifically, the faces of the large gear 15 for coming in contact with the felt members 14a and 14b are formed such that a plurality of serrated portions each formed of a plurality of grooves 20c provided in each of the spaces between the grooves 20b come in contact with the felt member 14b, and that a plurality of serrated portions each formed of a plurality of grooves 20c provided in each of the spaces between the grooves 20a come in contact with the felt member 14a As discussed above, in accordance with the fourth embodiment of the present invention, a plurality of grooves 20c concentric with the large gear 15 are provided at the positions that do not correspond to the convexities provided on the small gear 13 and the synchronous member 16. Thus, the weight-reduction of the large gear 15 can be performed, the contact area between the large gear 15 and the felt members 14a and 14b is reduced, the felt members 14a and 14b are surely subjected to a slippage by being guided by the grooves 20c, and thereby a restricting operation with stability based on a predetermined torque limit value can be performed.

Moreover, each of the spaces between the grooves 20c is formed in a serrated shape, and those serrated portions are arranged to come in contact with the felt members 14a and 14b. Thus, the felt members 14a and 14b guided by those grooves 20c are surely subjected to a slippage, and thereby a restricting operation with stability based on a predetermined torque limit value can be carried out.

It should be understood that in the above embodiments, the gear mechanism with torque limiter is arranged such that the large gear 15 has the grooves 20a and 20b provided on the upper face and the lower face thereof, and the small gear 13 and the synchronous member 16 opposing the large gear 15 through the felt members 14a and 14b have the convexities 19a and 19b provided on the face thereof, respectively; however, also when the gear mechanism with torque limiter is arranged such that the large gear 15 has the convexities 19a and 19b on the upper face and the lower face thereof, and the small gear 13 and the synchronous member 16 opposing the lower face and the upper face of the large gear 15, respectively, have provided the grooves 20a and 20b on the face thereof, respectively, there can be obtained the effect similar to those of the above-discussed embodiments.

INDUSTRIAL APPLICABILITY

As discussed above, the gear mechanism with torque limiter according to the present invention is arranged such that one gear has the concentric grooves provided on the face thereof coming in contact with the felt member so that the grooves corresponds to the convexities provided on the face coming in contact with the felt member of the other gear, respectively. Thus, even if the convexities pierce the felt member because the thickness of the felt member is reduced due to deterioration with age, contact between the tip of each of the convexities of the other gear and the one gear can be prevented, the occurrence of a slippage caused by a predetermined torque is stabilized, a positive restricting operation based on a torque limit value can be thereby performed, and further, abnormal noise by contact therebetween can be prevented. Therefore, the gear mechanism with torque limiter is suitable for use in a vehicle-mounted video apparatus or the equivalent using a gear mechanism with torque limiter.

The invention claimed is:
1. A gear mechanism with torque limiter comprising:
a first gear, a second gear, and a synchronous member coaxially arranged in the respective order, the second gear having concentric grooves or protrusions on both the face opposing the first gear and the face opposing the synchronous member; a first felt member, held between opposing faces of the synchronous member and the second gear; and
a second felt member that is held between opposing faces of the second gear and the first gear,
wherein one of the opposing faces coming in contact with the first felt member includes multiple conical protrusions concentrically arranged and the other opposing face coming in contact with the first felt member includes concentric grooves corresponding to the protrusions provided on the other opposing face thereof, and
wherein one of the opposing faces coming in contact with the second felt member includes multiple protrusions concentrically arranged and the other opposing face coming in contact with the second felt member includes concentric grooves corresponding to the protrusions provided on the other opposing face thereof, and
wherein the grooves or the protrusions provided on the other face of the second gear are positioned substantially intermediate in an interval between the grooves or the protrusions provided concentrically on the one face thereof.
2. The gear mechanism with torque limiter according to claim 1, wherein the concentric grooves have a depth greater than or equal to the height of the corresponding protrusions.

3. The gear mechanism with torque limiter according to claim 1, wherein the second gear has grooves or protrusions concentrically provided on the upper and lower faces thereof to be substantially constant in the entire thickness.

4. The gear mechanism with torque limiter according to claim 1, further comprising:
 a plurality of concentric second grooves provided on the opposing face coming contact with the first or second felt member including the concentric grooves, wherein
 the protrusions provided on the other opposing face coming in contact with the first or second felt member are arranged with a radial gap, and
 the plurality of concentric second grooves are provided at positions corresponding to the gap.

5. The gear mechanism with torque limiter according to claim 4, wherein the plurality of concentric second grooves are arranged such that a serrated shape is formed between adjacent two grooves of the plurality of concentric second grooves.

6. The gear mechanism with torque limiter according to claim 1, wherein the second gear further comprises a plurality of concentric grooves provided thereon at positions not corresponding to the protrusions provided on either the first gear or the synchronous member.

7. The gear mechanism with torque limiter according to claim 6, wherein a felt-contacting section having a plurality of grooves provided therein is formed in a serrated shape.

* * * * *